May 17, 1960

P. J. PINGON 2,937,012

CONCRETE MIXING MACHINE

Filed April 28, 1958

INVENTOR
PIERRE JOSEPH PINGON
By Irwin S. Thompson
ATTY.

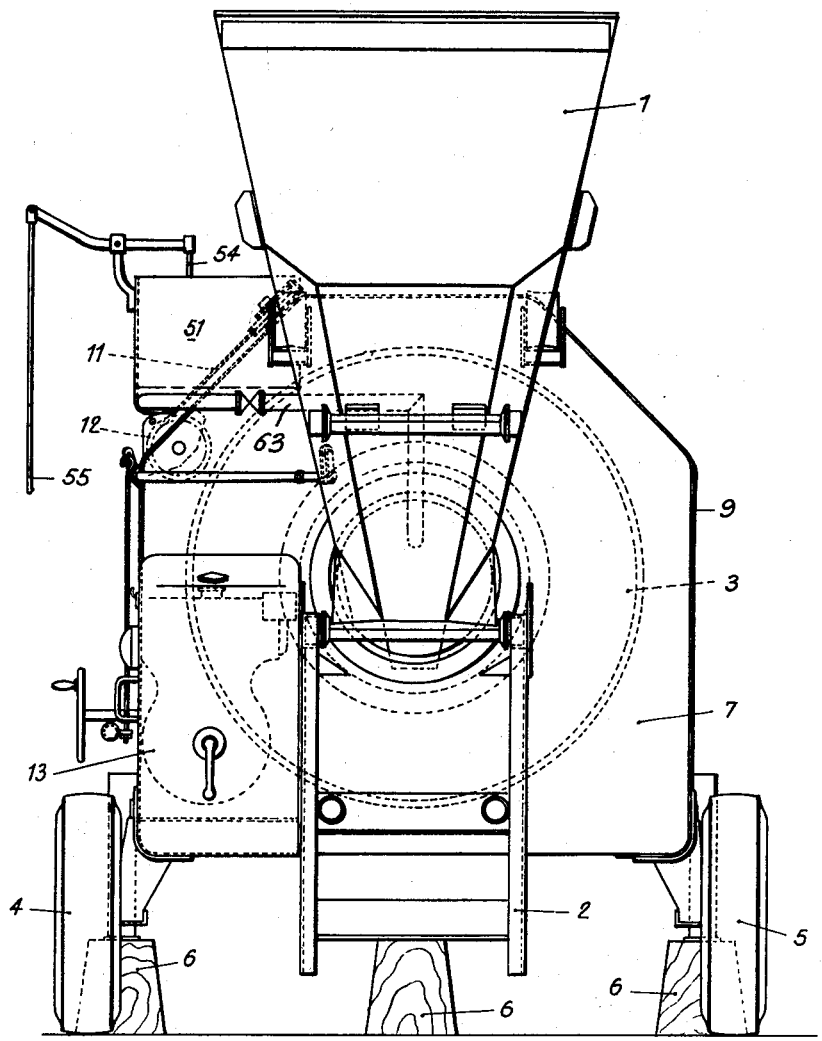

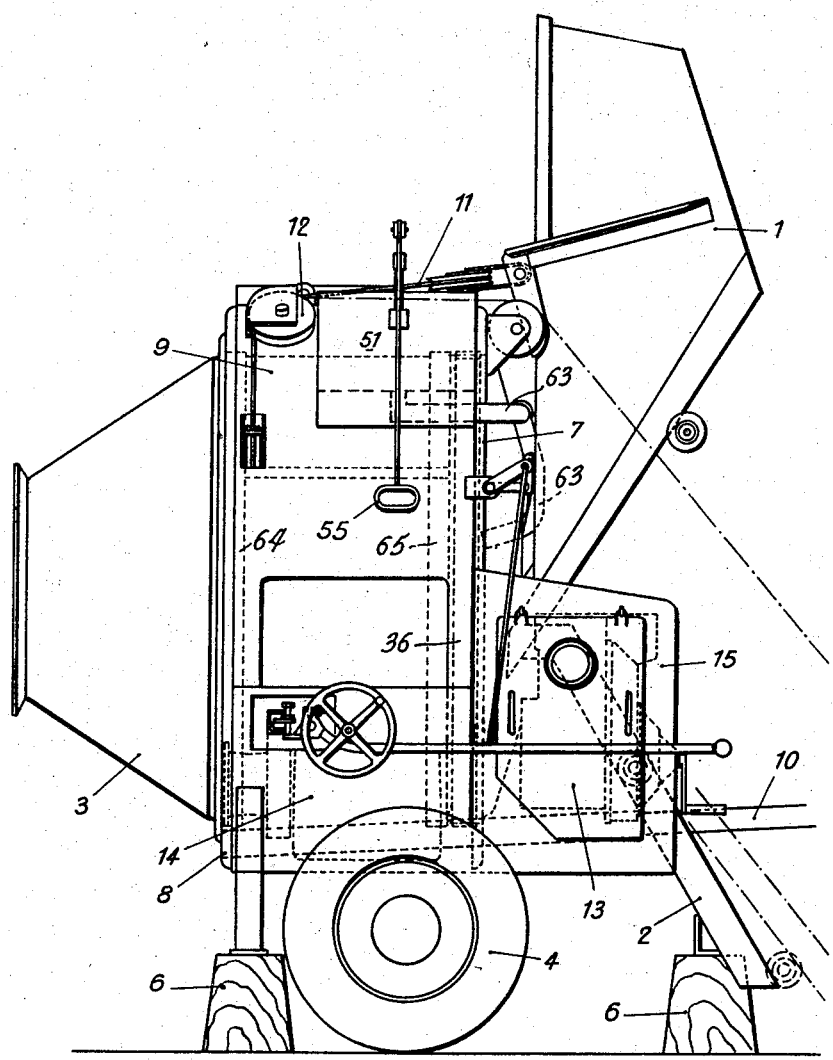

May 17, 1960  P. J. PINGON  2,937,012
CONCRETE MIXING MACHINE
Filed April 28, 1958  6 Sheets-Sheet 4

INVENTOR
PIERRE JOSEPH PINGON
BY Irwin S. Thompson
ATTY.

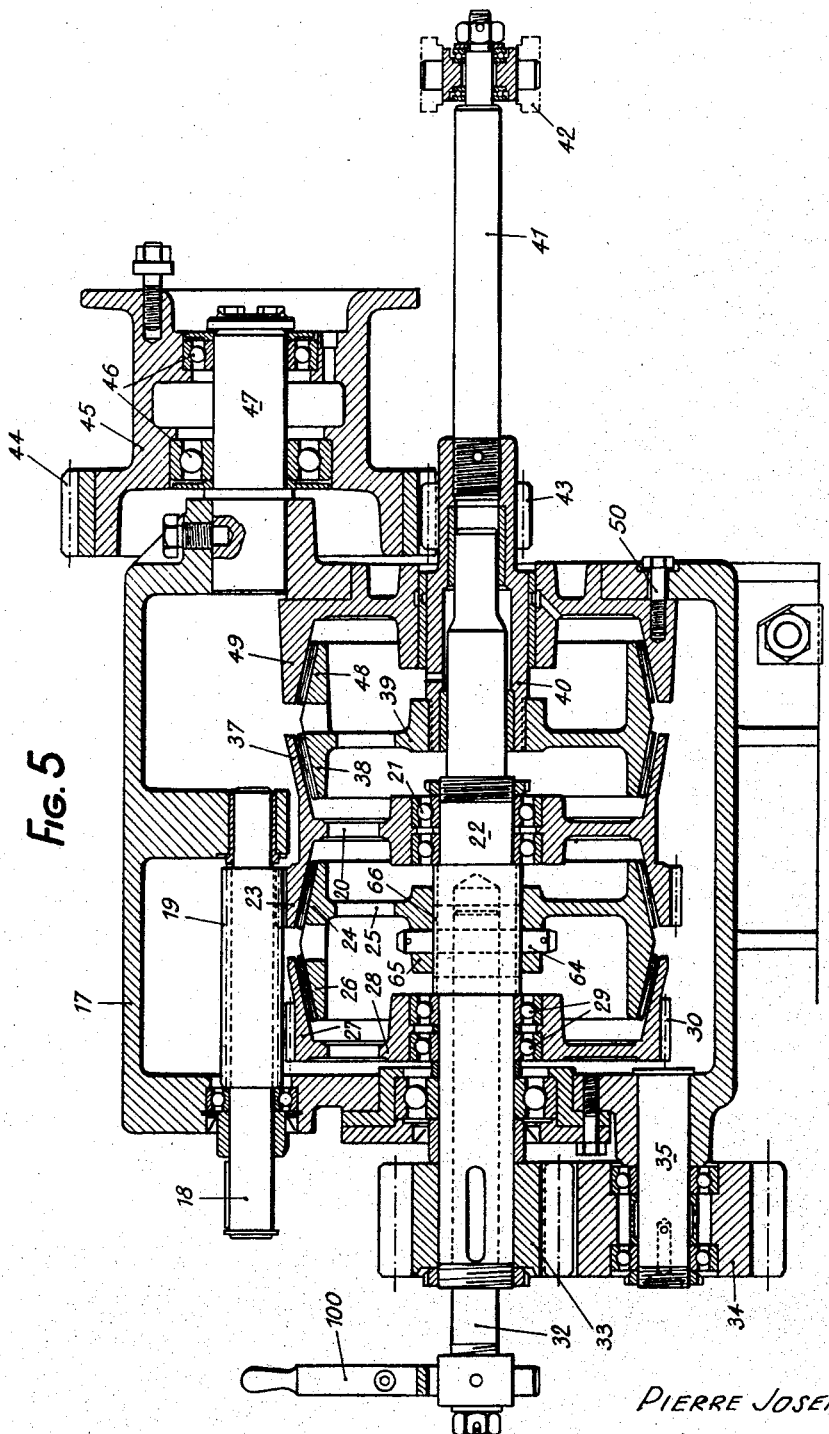

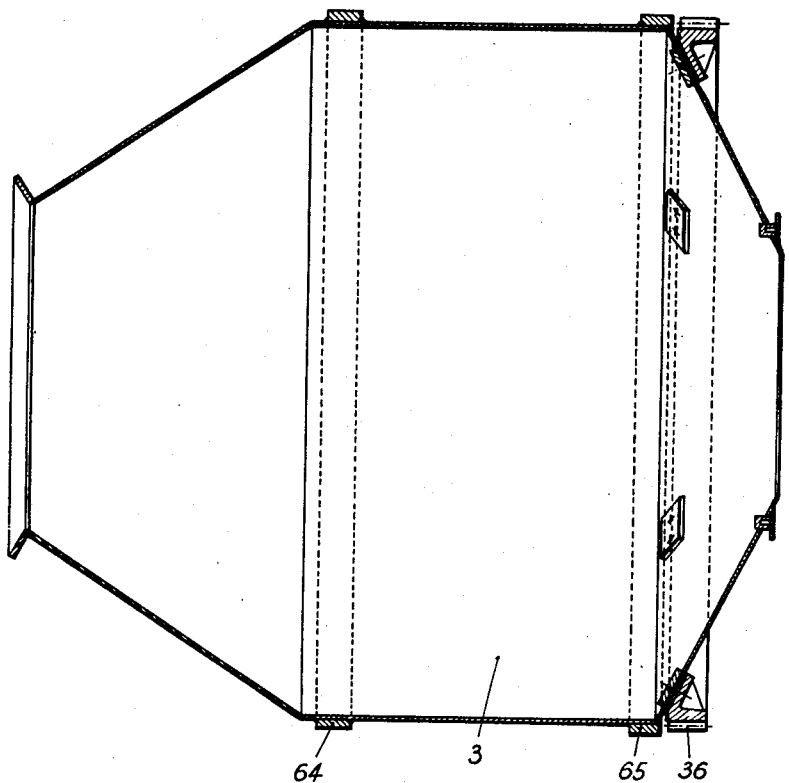

2,937,012

CONCRETE MIXING MACHINE

Pierre Joseph Pingon, Annecy Haute Savoie, France

Application April 28, 1958, Serial No. 731,422

Claims priority, application France November 26, 1957

4 Claims. (Cl. 259—167)

The present invention relates generally to concrete-mixing machines and has more particular reference to machines of this category including a horizontal rotatable drum adapted to be emptied of its contents by reversing the direction of rotation of said drum.

It is known that a concrete-mixing machine is usually made up of a rotatable drum, a charging hopper, a prime mover and a casing containing a reducing gear through which the drum is rotated and the hopper is actuated.

Existing concrete-mixing machines of small and medium size often comprise a four wheeled chassis on which the drum, the gear casing and the prime mover are longitudinally aligned, the hopper being arranged at right angles to the assembly thus constituted. Such an arrangement of the elements of the machine provides a lengthy unit in the towing direction while the disposition of the hopper sidewise of the assembly renders the latter still more cumbersome. Moreover the two wheels of the chassis adjacent the drum outlet are often clogged by concrete and aggregates being poured which is a serious disadvantage. Finally the control members on the gear casing are generally situated at some distance from the operating station of the machine.

In an attempt to overcome the aforesaid disadvantages, concerete-mixing machines have already been built including one axle extending at right angles to the rotational axis of the horizontal drum. Machines thus built are indeed less cumbersome than others but they involve a technical problem, namely the method of properly mounting the prime mover and gear casing on the chassis which in this constructional form is relatively very short. In some existing constructions, at least one of the foregoing elements is accommodated under the runway for the hopper. Consequently, said runway must be raised, thereby impairing the advantages resulting from the compact structure of the machine while rendering the same more bulky and cumbersome. Attempts were also made to arrange at least one of the aforesaid elements sidewise of the drum. However the unit made up of the prime mover and gear casing then overhangs one wheel of the machine which thus loses its balance unless it is preferred to separate the prime mover from the casing and to provide additional transmissions.

It is an object of the invention to provide a new or improved concrete-mixing machine differentiating itself from known machines of this kind by a better distribution of the positions allotted to the prime mover and gear casing, such result being obtained owing to the use of a casing of a novel type having a very reduced volume.

Another object of the invention is to provide an improved concerete-mixing machine as aforesaid having only one axle extending at right angles to the rotational axis of the drum, wherein the prime mover and the gear casing are sequentially mounted lengthwise of the machine on an axis extending parallel to the rotational axis of the drum and are housed in the space defined between the runway for the hopper and the mixing drum and the general plane of one wheel of the supporting axle.

Viewed in a particular aspect, the invention is embodied in a concrete-mixing machine wherein the prime mover is arranged rearwardly of the machine between the runway for the hopper and the general plane of the adjacent wheel of the supporting axle while the gear casing is accommodated ahead of the prime mover in the space defined between the periphery of the drum and said plane of the adjacent wheel. Owing to this arrangement, the machine frame may comprise a pair of upright plates, namely a front plate and a rear plate associated with a shroud or housing constituted by a suitably shaped metal sheet encompassing the peripheries of said upright plates and surrounding the drum, the gear casing being accommodated in said housing while a rearwardly extending hood adjacent the runway for the hopper contains the prime mover, said hood being connected directly to the rear upright plate.

Owing to this arrangement, no element or block of the machine projects from the housing and the wheels carried by the supporting axle are perfectly clear of any obstruction. Moreover the control members may be grouped sidewise of the machine at a position where the prime mover and the gear casing are situated so as to be readily accessible for the operator who may from the position he occupies easily supervise the work being done.

According to a constructional feature of the invention, the gear casing which revolves the drum and actuates the hopper has a particularly compact structure and includes an input shaft having teeth which mesh with a primary female clutch element and with an intermediate pinion which actuates a secondary female clutch element, these two elements being revolubly carried by a main shaft on which is splined a dual male element selectively engageable with the one or the other female elements depending upon the direction in which it is desired to revolve the drum (mixing step or discharging step) said main shaft having a pinion from which actuation of the ring-shaped gear on the drum is derived. The primary female clutch element forms a pair of female cones, the second cone being adapted to cooperate with a dual male element mounted upon a slidable sheath member which caps the adjacent end of the main shaft, said sheath member having a pinion which constantly meshes with a ring-shaped gear rigidly connected to the hopper cable winding drum member, while the second male cone of the last-named element may be selectively applied against a female braking cone rigid with the gear casing so as to brake down the hopper motion.

It follows from this constructional arrangement that the four male clutching cones which actuate the drum in the two directions and which put a driving or braking stress on the hopper are disposed coaxially and are supported by a pair of elements respectively connected for joint angular motion with the main shaft and with the sheath member which caps said shaft. The torque is transmitted from the teeth on the input shaft through the medium of a dual female element the two cones of which perform the rotation of the drum and the actuation of the hopper respectively. Consequently the gear casing has a compact structure and a reduced height which permits the same to be accommodated between the periphery of the drum and the metal sheet shroud which forms its housing.

A further object of the invention is to provide a concrete-mixing machine comprising a flushing tank adapted easily to supply at the operator's discretion an adjustable quantity of water, wherein the position of the float contained in said flushing tank and checking the water intake may be modified so as to suit requirements by fitting the float stem on an axis supported in the tank wall by a pair of hard trunnions, said axis being advantageously shifted manually by means of a needle mounted upon its end adjacent to the machine control members and movable in front of a graduated scale.

A still further object of the invention is to provide a concrete-mixing machine as aforesaid wherein the ring-shaped or crown gear rigidly connected to the drum is actuated by a pinion driven by the main output shaft of the gear-casing outside the customary runways, said ring-shaped gear being advantageously located adjacent the rear end of the drum i.e. near the end remote from the discharge outlet of the drum where the main output shaft projects from the gear casing at its rear end, the diameter of said ring-shaped gear being at the utmost equal to the outer diameter of the runways for the drum, thereby permitting easy mounting and dismounting of the drum with respect to the machine frame without preliminary separation of the ring-shaped gear while simplifying the assembling steps since the ring-shaped member is situated well outside the runways.

With these and such other objects in view as will incidentally appear hereafter, the invention comprises the novel construction and combination of parts that will be now described with reference to the accompanying diagrammatic drawings exemplifying the same and forming a part of the present disclosure.

In the drawings:

Figure 1a is a rear elevational view thereof.

Figure 2 is a corresponding side elevational view of the machine.

Figure 5 is a longitudinal sectional view of the gear casing drawn on a larger scale.

Figure 8 is an axial sectional view of the machine drum.

Figure 1:
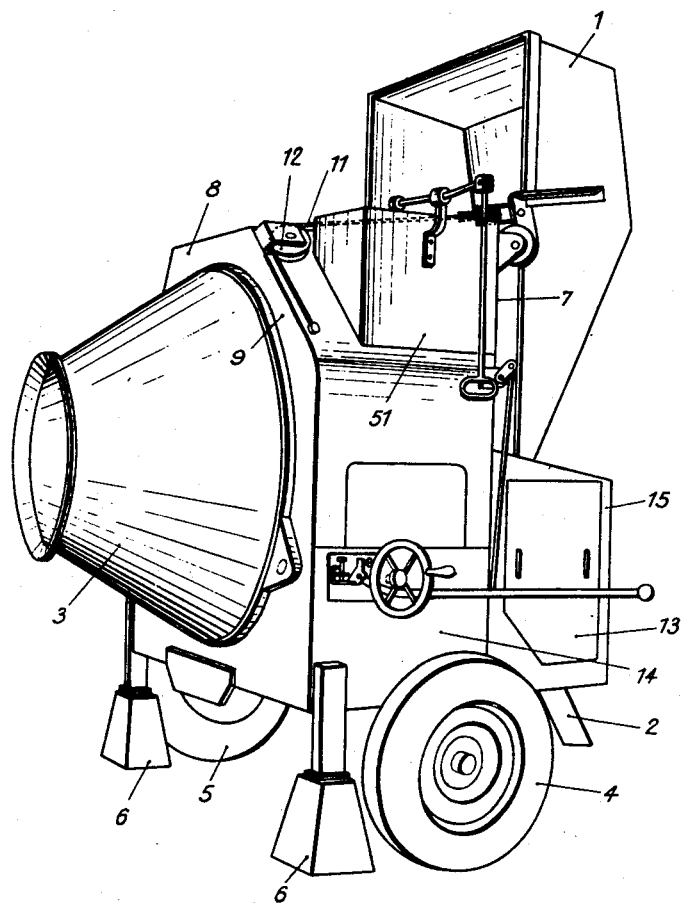
Figure 1 is a perspective view of a concrete-mixing machine in accordance with the invention.
Figure 4:
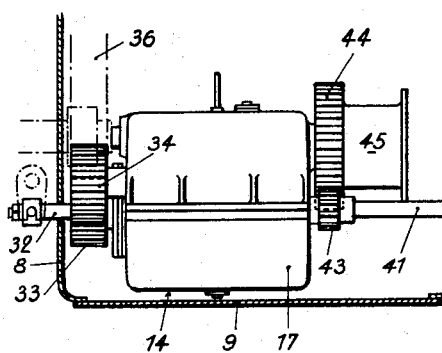
Figure 4 is a side view corresponding to Fig. 3.

As illustrated, the machine comprises, as usual, from its rear end to its front end a filling hopper 1 mounted on a runway 2 and a mixing drum 3, the assembly thus formed being supported by a chassis carried by wheels 4, 5 whose rotational axis extends at right angles to the major longitudinal axis of the machine. In operative position, the chassis is held motionless by legs 6 providing a three point propping support. The framework of the machine comprises a rear upright plate 7 and a front upright plate 8 also a shroud or housing 9 made of suitably formed sheet metal, the transverse shape of which is clearly visible in Figs. 1 and 1a. The assembly thus constituted may be towed by a vehicle by means of a hitch bar 10. In the drawings, 11 designates the control cable for the hopper 1 which is led by guiding pulleys 12. By hauling in the control cable 11, the filling hopper 1 is drawn up the runway 2 and caused to tilt so as to discharge into the mixing drum 3, and by paying out the cable 11, the reverse operation will be effected.

Figure 3:
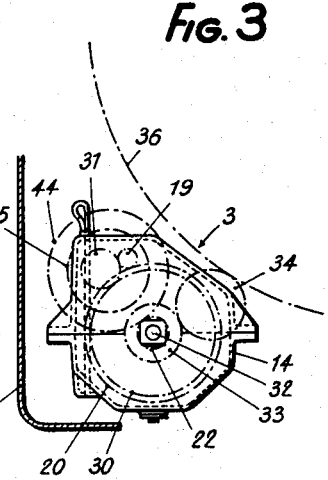
Figure 3 is a fragmentary sectional view showing the position of the gear casing.

According to the invention, the prime mover 13 which may be for example an electric motor or an internal combustion engine and the gear casing 14 are mounted sequentially in the fore-and-aft direction of the machine between the runway 2 and drum 3 and between the planes of the wheels 4 and 5. Actually and as visible in Fig. 3, the gear casing 14 is housed in the space defined between the periphery of the drum 3 and the shroud 9 and is supported by the upright plates 7, 8. The prime mover 13 is accommodated in a specially shaped hood 15 connected to the rear upright plate 7 and housed in the space between the runway 2 and the plane of the supporting wheel 4. Owing to this arrangement, said elements do not increase the volume of the machine which thus has a compact structure. The runway 2 may be quite close to the rear upright plate of the drum so as to reduce the overall length of the machine, thereby facilitating transportation thereof. The width of the machine is limited to the size enforced by the shrouding of the drum 3. The mechanical arrangement according to the invention thus permits the prime mover and the gear casing to be accommodated inside the normal perimeter of the machine while connecting them to a unitary block or unit, thereby saving the need for additional transmissions. As shown by Figs. 1, 1a and 2, all control members are clustered on one side of the machine in the neighborhood of the operating station.

The mixing drum 3 of the machine comprises in known fashion a pair of runways 64, 65 of the usual type extending adjacent the ends of its cylindrical middle portion and adapted to roll upon supporting rollers (not shown) provided as usual in the machine frame.

In the present construction, the ring-shaped gear 36 which revolves the drum 3 is situated outside the runways 64, 65 and well beyond the rearwardly located runway 65 so that it is operatively engaged by the pinion 34 (see Fig. 3) fitted upon the rear (motor side) end of the gear casing.

As shown, the diameter of the ring-shaped gear 36 is not larger than the diameter of the runways 64, 65. This permits the drum to be readily mounted upon or dismounted from the machine frame without any need to remove the gear 36. If found convenient, the diameter of this gear may be slightly smaller than the diameter of the runways.

In the sectional showing of Fig. 5 is illustrated the arrangement of the encased transmission which permits its overall size to be kept down to a small value and makes it possible to house said transmission casing between the periphery of the drum 3 and the metal sheet shroud 9. In this showing, the casing wall is designated by 17. The input shaft 18 which is driven by the prime mover is journalled in the casing wall and carries a lengthy gear 19 which meshes directly with a dual female clutch element 20 mounted through bearings 21 upon the hollow main shaft 22. Said element 20 has a female cone 23 with which may be contacted a male cone 24 carried by a male clutch element 25 splined on the main shaft 22. Said element 25 carries a further male cone 26 which may contact a female cone 27 carried by an element 28 supported through bearings 29 by the main shaft 22 and having a peripheral gear 30 driven from the gear 19 through the medium of a reversing gear 31. A slidable shaft 32 housed in the hollow shaft 22 and controlled from a fork member 100 permits the dual element 25 to be so shifted as to selectively apply its male cone 24 against the female cone 23 or alternatively its male cone 26 against the female cone 27. In the first case, rotation of the input shaft 18 is transmitted in a given direction to the main shaft 22. In the second case, however, rotation of the input shaft 18 is transmitted in the reverse direction. The shaft 22 carries a pinion 33 which meshes with another pinion 34 rotatably supported by a stub shaft 35 and meshing with the ring-shaped gear 36 on the drum 3. The latter may thus be selectively driven in the one or the other direction depending upon whether it is desired to fill or to discharge the same.

The dual female clutch element 20 carries a further female cone 37 against which may be applied a male cone 38 carried by a dual element 39 keyed upon one end of the sheath member 40 which caps the reduced end of the main shaft 22 and is mounted for sliding motion. The sheath member 40 is shifted axially from a rod 41 to which motion is imparted by a fork member 42. The end of the sheath member 40 which projects outside the casing 17 has a gear 43 which meshes with a ring-shaped gear 44 on the drum member 45 for winding the hopper cable. Said drum member is carried through bearings 46 on a stub shaft 47 nested in a recess of the wall of the casing 17. The element 39 carries a further male cone 48, which may be applied against a companion female cone 49 forming what may be termed a braking cone and rigidly connected to the casing 17 by bolts 50.

As the rod 41 is shifted leftwards (Fig. 5) the male cone 38 is urged against the female cone 37 formed on the element 20 which is directly driven from the gear 19. The resultant motion is transmitted by the element 39, the sheath member 40, the gear 43 and the ring-shaped gear 44 to the drum member 45 which operates the hopper 1. Conversely as the rod 41 is shifted to the right, the male cone 48 is applied against the female cone 49 thereby slowing down the movement of the hopper 1 by a braking action.

It will be noticed that the two male elements 25 and 39 of the clutches are dual elements which are mounted coaxially and comprise a single web carrying a pair of male cones which extend in opposite directions. Likewise the female element 20 is a dual single-webbed element carrying a pair of female cones and driven directly from the input shaft of the casing, said female cones directly transmitting the power torque for actuating the drum 3 and the hopper cable winding drum member. There is thus provided a sturdy transmission of compact shape and relatively small weight whose size is sufficiently reduced for enabling the same to be accommodated between the drum periphery and the metal shroud as hereinbefore set forth.

Figure 6:
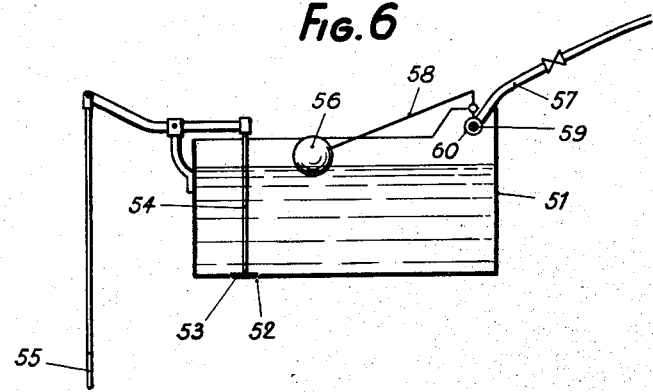
Figures 6 and 7 are diagrammatic plan and elevational views of the flushing tank included in the machine.
Figure 7:
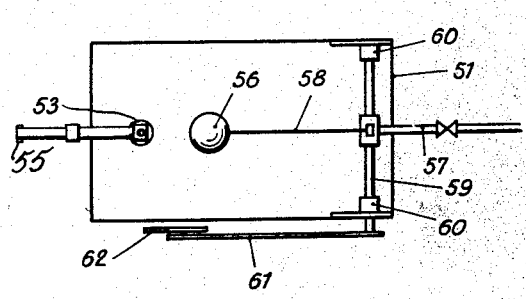

In the diagrammatic showing of Figs. 6 and 7 is illustrated the flushing tank 51 which is also visible in Figs. 1a and 2. As usual, this tank comprises an outlet 52 associated with a seat against which is urged a valve 53 carried by a rod 54 and controlled from a knob 55. A float which continuously checks the intake of water flowing to the tank 51 through a pipe 57 is carried by a bent rod 58 associated with a transverse axis 59 rotatably supported by the side walls of the tank 51 by hard trunnions 60. The end of the axis 59 situated outside the tank carries a pointer 61 movable in front of a scale 62. Forced motion of the pointer 61 and consequently of the axis 59 alters the adjustment of the flushing tank and the position of the float 56 heightwise. This stops the water intake through the pipe 57 as a different filling level is reached at every occurrence in the tank 51, thereby enabling the operator to cause a suitable quantity of water to be admitted into the mixing drum 3 through conduit 63 which may be seen in Figs. 1a and 2.

Minor constructional details may be varied without departing from the scope of the subjoined claims.

What is claimed is:

1. In a concrete-mixing machine having a mixing drum revoluble about a horizontal axis and dischargeable by reversal of its direction of rotation about said axis, a filling hopper aligned lengthwise with said drum, a hopper-controlling cable, a drum member for winding said cable, a runway for said hopper, the combination comprising a single two-wheeled carrier axle at right angles to said drum axis, a motor and a gear casing arranged sequentially lengthwise of the machine on an axis parallel to said drum axis in the space between said runway and drum and the plane of one said wheel, said gear casing comprising gear means for revolving the drum and actuating the hopper and including an input shaft connected to said motor, a gear on said shaft, a primary female clutch element meshing with said gear, a reversing pinion meshing with said gear, a secondary female clutch element operated by said pinion, a main shaft on which are revolubly supported said clutch elements, a dual male clutch element splined on said main shaft to be selectively engageable with said female clutch elements depending upon the direction of rotation to be imparted to the drum, a pinion fast on said main shaft, and a gear transmission between the last-named pinion and the drum.

2. A concrete-mixing machine according to claim 1, said gear means including primary and secondary female cones on said primary female clutch element, a slidable sheath member capping one end of the main shaft, a dual male clutch element having two cones carried by said sheath member for cooperation with said secondary female cone, a pinion on said sheath member, a hopper cable winding drum member, a ring-shaped gear rigid with said hopper cable winding drum member, said gear being in constant mesh with said pinion, a stationary female braking cone, and means for applying one cone of said dual male clutch element against said female braking cone so as to slow down the movement of the hopper cable winding drum member.

3. A concrete-mixing machine having a mixing drum revoluble about a horizontal axis and dischargeable by reversing its direction of rotation about its axis, a hopper aligned lengthwise with said drum, a runway for said hopper, a prime mover, gear transmission means actuated by said prime mover for selectively driving said revoluble drum and said hopper, and a single two-wheeled carrier axle extending at right angles to the rotational axis of the drum, said prime mover and gear transmission means being positioned sequentially lengthwise of the machine on an axis extending parallel to the axis of the drum in the space defined between said runway and drum on the one hand and the plane of one of the wheels carried by said axle on the other hand.

4. A concrete-mixing machine having a mixing drum revoluble about a horizontal axis and dischargeable by reversing its direction of rotation about its axis, a hopper aligned lengthwise with said drum, a runway for said hopper, a prime mover, gear transmission means actuated by said prime mover for selectively driving said revoluble drum and said hopper, and a single two-wheeled carrier axle extending at right angles to the rotational axis of the drum, said prime mover being positioned adjacent the rear end of the machine between said runway and the plane of one of the wheels of said axle, and the gear transmission means being aligned lengthwise with said prime mover and housed in the spaced between said drum and said plane adjacent the front end of the machine, said prime mover and casing being situated on a longitudinal axis parallel to the rotational axis of the drum.

References Cited in the file of this patent
UNITED STATES PATENTS

| | | |
|---|---|---|
| 775,242 | Judd | Nov. 15, 1904 |
| 1,988,967 | Emrick | Jan. 22, 1935 |
| 2,276,125 | Viall | Mar. 10, 1942 |
| 2,375,524 | Clark | May 8, 1945 |
| 2,492,792 | Ford | Dec. 27, 1949 |

FOREIGN PATENTS

| | | |
|---|---|---|
| 335,496 | Italy | Feb. 6, 1936 |
| 899,771 | Germany | Dec. 17, 1953 |